3,074,891
COMPOSITIONS AND METHODS FOR THE
DEODORIZATION OF SPACES
Kurt Kulka, New York, N.Y., assignor to Fritzsche Brothers, Inc., New York, N.Y., a corporation of New York
No Drawing. Filed Mar. 24, 1960, Ser. No. 17,259
19 Claims. (Cl. 252—305)

This invention relates to deodorization of spaces and more particularly to methods and compositions for deodorization of spaces.

Various methods and substances have been utilized for the deodorization of malodors arising in kitchens, bathrooms, sickrooms, smoke-filled living rooms and spaces saturated with odors stemming from perspiration of men and household pets. Some of these methods and deodorants have depended upon the masking of the malodors by the impairment of smell. The use of formaldehyde is an example of such masking. Other methods involve superimposing the malodor with another stronger odor. Still other methods employ masking by neutralization with certain odoriferous compositions which have the property when added to a malodor of affecting a weaker odor instead of an enhanced odor as might be expected by such addition. All of these methods as well as those utilizing the adsorption of the malodors on surfaces of materials such as carbon or those entailing the oxidation of the malodor have serious drawbacks. The adsorption of malodors is not practical and is almost impossible to apply without specialized equipment in the deodorization of a room since the gaseous content of the room must be brought in contact with the solid sorption medium. To be sure, deodorization utilizing oxidation is effective, however it is impractical and might even present problems of fire hazard and toxicity. The masking by impairing the sense of smell usually produces significant irritation of the smelling nerves. On the other hand, superimposing one odor over the malodor frequently results in a combined sickening odor which is sometimes more repellent than the malodor itself. Finally, masking by neutralization is ineffective because of the large amount of diversified malodors which are encountered in the deodorization of spaces.

In accordance with this invention, deodorization of a space is effected with a deodorant which does not impair the sense of smell, and which at the level of use is not toxic to man and domesticated animals. The action of the deodorants of this invention does not depend upon superimposing the malodor with another, masking the malodor by neutralization or adsorption or oxidation of the malodor. Rather, the compositions employed as deodorant in the practise of this invention are capable of undergoing chemical reactions with a great number of functional groups such as those contained in some of the components of the malodors frequently encountered in spaces.

An object of this invention is to deodorize a space effectively and efficiently by chemical reactions with the malodors.

This invention involves the deodorization of a space by spraying into the space a deodorant comprising an ester dissolved in a solvent, such as an alcohol, a glycol or a hydrocarbon. The ester is an ester of an alpha,beta- or a hydrocarbon. The ester is an ester of an alpha,beta-unsaturated monocarboxylic acid which has 4 or more carbon atoms and which does not have a $CH_2$ group attached to an unsaturated carbon atom of the acid moiety. The ester is propelled by the solvent or a propellant, or both, as commonly used in the "aerosol" type of spray. Other spray type equipment may be used, such as atomizers or household sprayers. In such cases, air would be the customary propellant. The propellant which may also be the solvent for the ester is usually gaseous under normal conditions of pressure and temperature but is adapted to be non-gaseous at normal temperatures by application of pressure. Examples of propellants are nitrogen and halogenated hydrocarbons such as trichloro-monofluoromethane and dichloro-difluoro-methane. The esters of the alpha,beta-unsaturated monocarboxylic acids utilized in the practise of this invention, unlike the esters of acrylic and methacrylic acids, are not prone to polymerize and have the following formula:

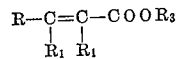

in which R is either hydrogen or an alkyl group, $R_1$ is an alkyl group, $R_2$ is either hydrogen or an alkyl group and $R_3$ is an alkyl, alkylene, aryl, aralkyl or cycloalkyl group.

Examples of unsaturated monocarboxylic acids, the esters of which may be utilized in the practise of this invention, are crotonic acid, tiglic acid, senecioic acid, alpha,beta-isohexenic acid and cinnamic acid. The esters may be alkyl esters, such as butyl crotonate, isoamyl tiglinate, ethyl cinnamate, or ethyl alpha,beta-isohexenoate, alkylene esters such as geranyl crotonate, geranyl tiglinate, aryl esters such as benzyl crotonate, aralkyl esters such as 3-phenyl-1-propyl crotonate, or cycloalkyl esters such as 1-menthyl senecioate. The esters of the alpha,beta-unsaturated monocarboxylic acid employed as a deodorant and in the practise of this invention are prepared by conventional methods such as esterification of an alcohol with the acid, by an exchange reaction of a lower molecular weight ester of the acid with a higher alcohol in which the formed lower alcohol is distilled off, or by the reaction of the acyl chloride of the acid with the alcohol. Desirably, the alcohol reactant has at least 4 carbon atoms.

The concentration of the ester of the unsaturated acid in propellant may vary over wide limits. Usually at least 0.5 or 1% and up to 5% of the ester is desirably employed and generally at least 75% or 80% of the propellant is preferably used. In some situations, higher concentrations of the ester may be used. Instead of a single ester of the unsaturated acid, a plurality of esters of the same or different such acids may be employed.

The characteristics of the esters of the alpha,beta-unsaturated monocarboxylic acids render them especially effective deodorants in the practise of this invention. These esters are substantially non-irritating; they generally lend themselves well to be perfumed, giving the final product a desired odoriferous note if required. The esters, moreover, are miscible with the usual propellants and solvents employed for spraying. Finally, they are stable under normal conditions of use.

It is in this last property of stability that the esters of alpha,beta-unsaturated monocarboxylic acids employed in the practise of this invention differ so markedly from the esters of acrylic and methacrylic acid. The most pronounced reaction of the esters of acrylic and methacrylic acid is the free radical addition, namely, that of polymerization. A prerequisite for this reaction of polymerization is that a $CH_2$ group must be present at the end of a double bond, as it is in the acrylates and methacrylates, representing at least one unhindered and readily accessible end of the C:C bond in the acidic part. It is for this reason that the esters of acrylic and methacrylic acids polymerize readily under the influence of heat, light, oxygen, peroxide or other catalysts. On the other hand, the esters utilized in the practise of this invention are excluded from this polymerization reaction because they do not have the $CH_2$ group attached to either unsaturated carbon atom of their acid moiety.

Accordingly, when a spray of a propellant containing acrylic or methacrylic esters is introduced into a space, the main reaction appears to be a spontaneous polymerization with relatively little chemical reaction with the chemical constituting the malodors. In contrast, while the exact mechanism of reaction of the esters of the deodorants of this invention is not conclusively proved, it is believed that, if a propellant containing an ester of the unsaturated acid of this invention is introduced into a space containing a malodor, such ester which is highly activated because it is released in a finely divided state, readily undergoes chemical reaction with the components of the malodors but without polymerization of such ester. Since such esters are known to react readily with many functional groups, malodors containing such functional groups are reacted with the esters to form compounds which are devoid of the malodors from which they are derived.

The deodorants comprising the solvent or propellant and the ester of the unsaturated acid used in the practise of this invention may be augmented with other materials, such as mono or polyhydric alcohols, hydrocarbons and perfumes.

The deodorants of this invention may be prepared in the same manner as other aerosol compositions are produced, such as the aerosol parasiticides described, for example, in U.S. Patent 2,321,023, granted to the Secretary of Agriculture as assignee of L. D. Goodhue et al. on June 8, 1943. In the practise of the present invention, a compatible propellant should be utilized and, instead of the parasiticide of the Goodhue et al. patent, there is employed an ester or esters of the alpha-beta-unsaturated monocarboxylic acids as specified in this invention with any other desired augmented component or components.

A more comprehensive understanding of this invention is obtained by reference to the following examples:

*Example 1*

A room deodorant is prepared, having the following composition:

0.5 part by weight of geranyl crotonate
12.5 parts by weight of isopropyl alcohol
4.0 parts by weight of triethylene glycol
3.0 parts by weight of propylene glycol
80.0 parts by weight of a mixture of equal parts of tri-chloro-mono-fluoro-methane and dichloro-difluoro-methane The composition is placed in an aerosol dispenser or it may be employed in a household spray device using a solvent, such as isopropyl alcohol or an alkane but omitting the halogenated alkane propellant.

The geranyl crotonate was prepared as follows:
There was placed in a distillation flask equipped with a 1½ foot Vigreux column the following mixture:

154 g. of geraniol
130 g. of methyl crotonate
3 g. of aluminum isopropylate
3 g. of sodium carbonate anhydrous The mixture was heated and the formed methanol distilled through the Vigreux column. In addition to the methanol formed, there was also distilled off 8 ml. of methyl crotonate. The reaction product was cooled and 100 ml. of benzene were added. The reaction product was then washed with 100 ml. of a 5% aqueous phosphoric acid solution, followed successively by 100 ml. of water and by 100 ml. of a 5% aqueous sodium bicarbonate solution, and finally with 100 ml. of water. The geranyl crotonate was recovered in about an 80% yield of the theoretical after distillation through a 1½ foot Vigreux column. It boiled at 125–127° C. at a vacuum of 5 mm., tested 99.9% of the ester and had a R.I. at 20° C. of 1.4677.

*Example 2*

A room deodorant is prepared having the following composition:

1.0 part by weight of octyl crotonate
12.0 parts by weight of isopropyl alcohol
4.0 parts by weight of triethylene glycol
3.0 parts by weight of propylene glycol
80.0 parts by weight of a mixture of equal parts of tri-chloro-monofluoro-methane and dichloro-difluoro methane The composition is placed in an aerosol dispenser.
The octyl crotonate was prepared as follows:
The following mixture was placed in a reaction flask equipped with a water trap:

45 g. crotonic acid
65 g. n-octanol
100 cc. benzene

The mixture was refluxed until the calculated amount of water produced in the reaction was formed. The reaction product was cooled, washed with 100 ml. of water, neutralized with a 10% aqueous solution of sodium carbonate and then washed with 50 ml. of water. The octyl crotonate was recovered in a 90% yield of the theoretical, boiled at 107–108° C. at a vacuum of 5 mm. and tested 98.5% of the ester. The R.I. at 20° C. was 1.4434.

*Example 3*

A deodorant is prepared having the following composition:

1 part by weight of benzyl crotonate
12.0 parts by weight of isopropyl alcohol
4.0 parts by weight of triethylene glycol
3.0 parts by weight of propylene glycol
80.0 parts by weight of a mixture of equal parts of trichloro-monofluoro-methane and dichloro-difluoro-methane The composition is placed in an aerosol dispenser.
The benzyl crotonate was prepared as follows:
Into a reaction flask equipped with a water trap, there was introduced the following mixture:

108 g. benzyl alcohol
90 g. crotonic acid
200 cc. benzene
3 g. p-toluenesulfonic acid The reaction mixture was refluxed for about three hours when the theoretical amount of water formed was collected. The reaction product was cooled, neutralized with a 5% aqueous sodium carbonate solution and then washed twice with 50 ml. of water. After removal of the benzene by distillation, the benzyl crotonate was obtained by distillation through a 1½ foot Vigreux column. The yield was about 75% of the theoretical, and the benzyl crotonate boiled at 121–122° C. at a 10 mm. vacuum. The R.I. at 20° C. was 1.511.

*Example 4*

A room deodorant is prepared, having the following composition:

1 part by weight of commercially available 2-ethylhexyl crotonate
12.0 parts by weight of isopropyl alcohol
4.0 parts by weight of triethylene glycol
3.0 parts by weight of propylene glycol
80.0 parts by weight of a mixture of equal parts of trichloro-monofluoro-methane and dichloro-difluoro-methane The composition is placed in an aerosol dispenser.

Example 5

A room deodorant is prepared, having the following composition:

1.0 part by weight of senecioic acid geranyl ester
12.0 parts by weight of isopropyl alcohol
4.0 parts by weight of triethylene glycol
3.0 parts by weight of propylene glycol
80.0 parts by weight of a mixture of equal parts of trichloro-monofluoro-methane and dichloro-difluoro-methane The composition is placed in a container with an aerosol dispenser.

The geranyl ester of senecioic acid was prepared as follows:

The acid chloride of senecioic acid was produced from the acid with thionyl chloride. 118 g. of this acid chloride was added over a period of 1 hour to a well agitated solution of 154 g. geraniol and 110 g. pyridine, keeping the temperature of the reaction between 10-15° C. After standing overnight at room temperature, the reaction mixture was heated to 80° C. for one hour. It was then cooled, washed with successive 50 ml. 5% aqueous hydrochloric acid to remove the pyridine, neutralized with a 10% aqueous sodium carbonate solution, then washed twice with 50 ml. water and the ester recovered in an 85% theoretical yield by distillation through a 1½ foot Vigreux column. It boiled at 145-150° C. at 10 mm. vacuum and had a R.I. at 20° C. of 1.4761.

Example 6

A room deodorant is prepared, having the following composition:

0.5 part by weight of commercially available ethyl cinnamate
12.5 parts by weight of isopropyl alcohol
4.0 parts by weight of triethylene glycol
3.0 parts by weight of propylene glycol
80.0 parts by weight of a mixture of equal parts of trichloro-monofluoro-methane and dichloro-difluoro-methane The composition is placed in a container with an aerosol dispenser.

Example 7

A room deodorant is prepared having the following composition:

0.5 part by weight of tiglic acid geranyl ester
12.5 parts by weight of isopropyl alcohol
4.0 parts by weight of triethylene glycol
3.0 parts by weight of propylene glycol
80.0 parts by weight of a mixture of equal parts of trichloro-monofluoro-methane and dichloro-difluoro-methane The composition is placed in a container with an aerosol dispenser.

The geranyl ester of tiglic acid was prepared as follows:

The acid chloride of tiglic acid was produced from the acid with thionyl chloride. 118 g. of this acid chloride was added over a period of 1 hour to a well agitated solution of 154 g. geraniol, and 110 g. pyridine, keeping the temperature of the reaction between 10-15° C. After standing overnight at room temperature, the reaction mixture was heated to 80° C. for 1 hour. It was then cooled, washed with 50 ml. 5% aqueous hydrochloric acid solution to remove the pyridine, neutralized with an aqueous 10% sodium carbonate solution, then washed twice with 50 ml. of water and the ester recovered in a 85% theoretical yield by distillation through a 1½ foot Vigreux column. It boiled at 149-151° C. at a vacuum of 7 mm. The R.I. at 20° C. was 1.4769.

The efficiency of the room deodorants of the Examples 1 through 6 were tested in various experiments. Two compositions of malodors were prepared in accordance with the formula developed by the General Services Administration of the United States Government. One of these malodors was a so-called tobacco smoke odor, while the other comprised the kitchen odor. In the testing, two separate, trained odor jury panels of three males and two females, and two males and three females first determined that the odor test rooms employed were clean and odorless. Into one of the test rooms there was introduced a three second aerosol spray of the malodor under test; e.g., the tobacco smoke odor, while a three second aerosol spray of the other malodor under test, e.g., the kitchen odor, was introduced into another room. This procedure was repeated in two other rooms which were used as controls. The deodorants containing the ester of the unsaturated acid was introduced in the form of a three second aerosol spray into the rooms containing each of the malodors. Using the trained odor jury panel of three males and two females and that of three females and two males, the rooms sprayed with the deodorant were compared with the rooms containing the malodor without any introduction of the deodorant one minute after application of the deodorant aerosol and five minutes after the application of the deodorant aerosol. There was a marked reduction of the malodor level in each of the rooms in which the deodorant was introduced as specified in accordance with the Federal specification of the General Services Administration. It was furthermore found that in the rooms in which the deodorant was introduced, there was retained a faint, pleasant, characteristic odor of the deodorant. The malodors in the control rooms in which no deodorant was introduced persisted most markedly in the same periods that the deodorized rooms showed such striking improvement.

The efficiency of the deodorants of this invention was further shown under actual and varied conditions by extensive applications in households, sick rooms and offices.

What is claimed is:

1. The method of deodorizing a space which comprises spraying into said space an ester of an unsaturated monocarboxylic acid having the following formula:

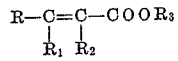

in which R is a member selected from the class consisting of hydrogen and alkyl groups, $R_1$ is an alkyl group, $R_2$ is a member selected from the class consisting of hydrogen and alkyl groups and $R_3$ is selected from the class consisting of alkyl, alkylene, aryl hydrocarbon, aralkyl hydrocarbon and cycloalkyl groups, said ester having less than 16 carbon atoms.

2. The method of deodorizing a space which comprises spraying into said space a deodorant comprising an ester of an unsaturated monocarboxylic acid propelled by a propellant which is gaseous under normal conditions of pressure and temperature but is adapted to be non-gaseous at normal temperatures by application of pressure, said unsaturated monocarboxylic acid having the following formula:

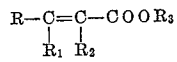

in which R is a member selected from the class consisting of hydrogen and alkyl groups, $R_1$ is an alkyl group, $R_2$ is a member selected from the class consisting of hydrogen and alkyl groups and $R_3$ is selected from the class consisting of alkyl, alkylene, aryl hydrocarbon, aralkyl hydrocarbon and cycloalkyl groups, said ester having less than 16 carbon atoms.

3. The method of deodorizing a space which comprises spraying into said space with pressure finely divided particles of a solution comprising an ester of an unsaturated monocarboxylic acid in a solvent, said unsaturated monocarboxylic acid having the following formula:

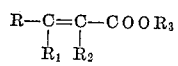

in which R is a member selected from the class consisting of hydrogen and alkyl groups, $R_1$ is an alkyl group, $R_2$ is a member selected from the class consisting of hydrogen and alkyl groups and $R_3$ is selected from the class consisting of alkyl, alkylene, aryl hydrocarbon, aralkyl hydrocarbon and cycloalkyl groups, said ester having less than 16 carbon atoms.

4. The method of deodorizing a space in accordance with claim 3, in which the ester of the unsaturated monocarboxylic acid is an ester of crotonic acid.

5. The method of deodorizing a space in accordance with claim 3, in which the ester of the unsaturated monocarboxylic acid is an ester of tiglic acid.

6. The method of deodorizing a space in accordance with claim 3, in which the ester of the unsaturated monocarboxylic acid is an ester of senecioic acid.

7. The method of deodorizing a space in accordance with claim 3, in which the ester of the unsaturated monocarboxylic acid is an ester of alpha,beta-isohexenic acid.

8. The method of deodorizing a space in accordance with claim 3, in which the ester of the unsaturated monocarboxylic acid is an ester of cinnamic acid.

9. The method of deodorizing a space in accordance with claim 3, in which the ester of the unsaturated monocarboxylic acid is an alkylene ester of crotonic acid.

10. The method of deodorizing a space in accordance with claim 3, in which the ester of the unsaturated monocarboxylic acid is an alkyl ester of crotonic acid.

11. The method of deodorizing a space in accordance with claim 3, in which the ester of the unsaturated monocarboxylic acid is an aralkyl ester of crotonic acid.

12. The method of deodorizing a space in accordance with claim 3, in which the ester of the unsaturated monocarboxylic acid is geranyl crotonate.

13. The method of deodorizing a space in accordance with claim 3, in which the ester of the unsaturated monocarboxylic acid is 2-ethylhexyl-crotonate.

14. The method of deodorizing a space in accordance with claim 3, in which the ester of the unsaturated monocarboxylic acid is benzylcrotonate.

15. A deodorant comprising an ester of an unsaturated monocarboxylic acid and a propellant gaseous under normal conditions of temperature and pressure but capable of being maintained in a non-gaseous state at normal temperature by the application of pressure, said unsaturated monocarboxylic acid having the following formula:

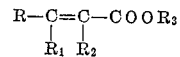

in which R is a member selected from the class consisting of hydrogen and alkyl groups, $R_1$ is an alkyl group, $R_2$ is a member selected from the class consisting of hydrogen and alkyl groups and $R_3$ is a member selected from the class consisting of alkyl, alkylene, aryl hydrocarbon, aralkyl hydrocarbon and cycloalkyl groups, said ester having less than 16 carbon atoms.

16. A deodorant comprising an ester of an unsaturated monocarboxylic acid dissolved in a solvent and a propellant gaseous under normal conditions of temperature and pressure but adapted to be maintained in a non-gaseous state at normal temperatures by the application of pressure, said unsaturated monocarboxylic acid having the following formula:

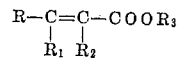

in which R is a member selected from the class consisting of hydrogen and alkyl groups, $R_1$ is an alkyl groups, $R_2$ is a member selected from the class consisting of hydrogen and alkyl groups and $R_3$ is a member selected from the class consisting of alkyl, alkylene, aryl hydrocarbon, aralkyl hydrocarbon and cycloalkyl groups, said ester having less than 16 carbon atoms.

17. A deodorant in accordance with claim 16, in which the ester of the unsaturated monocarboxylic acid is an alkyl ester of crotonic acid.

18. A deodorant in accordance with claim 16, in which the ester of the unsaturated monocarboxylic acid is an alkylene crotonate.

19. A deodorant in accordance with claim 16, in which the ester of the unsaturated monocarboxylic acid is an aralkyl crotonate.

References Cited in the file of this patent

UNITED STATES PATENTS 2,544,093    Kilgore _____ Mar. 6, 1951

OTHER REFERENCES

Turgasept: Turgasept Co., Div. of DOHO, 100 Varick, N.Y. 13, N.Y. (4 pp. information phamphlet).

Chem. Abs., ACS, vol. 49, 1955, page 13573b; vol. 51, 1957, page 8287h.

King: Agriculture Handbook No. 69, May 1954, U.S. Dept. of Agriculture, pp. 116–119, 124, 125, 309, 326.

Merck Index, Merck and Co., Rahway, N.J., 7th ed., recd. Mar. 18, 1960, page 1047.

Amer. Perf., May 1949, pages 396, 400.